March 3, 1931. C. G. KIPLINGER 1,794,714
MATERIAL HANDLING
Filed Nov. 6, 1925
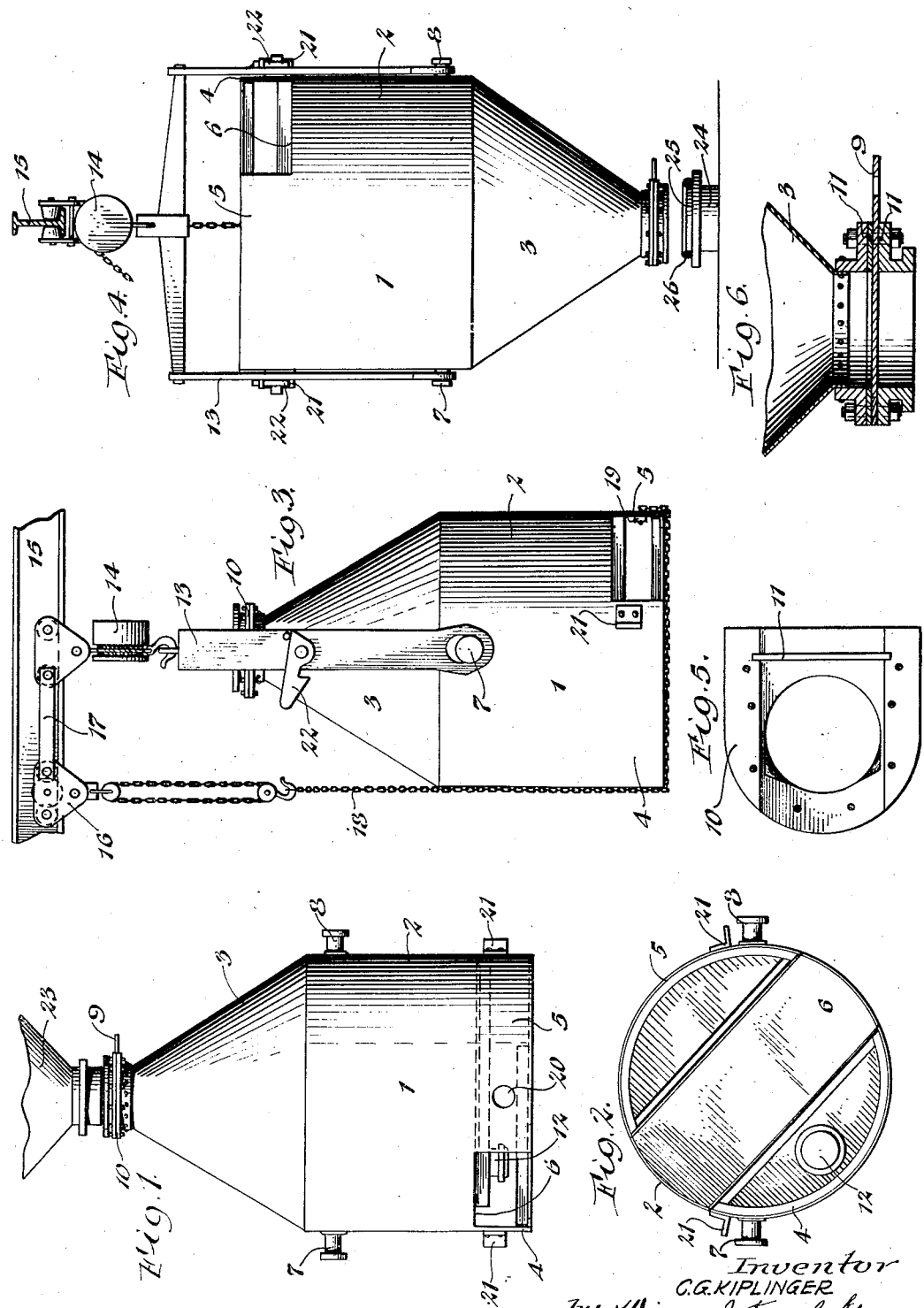
Inventor
C. G. KIPLINGER
by William J. Karslake
Attorney Patented Mar. 3, 1931

1,794,714

UNITED STATES PATENT OFFICE

CLARENCE G. KIPLINGER, OF BUFFALO, NEW YORK, ASSIGNOR TO NATIONAL ANILINE & CHEMICAL CO., INC., OF NEW YORK, N. Y., A CORPORATION OF NEW YORK

MATERIAL HANDLING

Application filed November 6, 1925. Serial No. 67,294.

This invention relates to the handling of materials and in particular to the handling and conveying of powder-like material.

In plant operation it is generally necessary to store material in one location, while its use is in one or more distant locations; but, when dry powder-like material is stored in bulk, as in large bins, the weight of the superimposed mass tends to pack the lower portion, and some agitation is then required to restore it to its original condition. It also happens with materials stored in large bins, that there is likelihood of contamination with foreign substances and of non-uniformity of the material. Consequently, where it is essential that the material delivered be uniform, some means are necessary for permitting testing and for controlling the delivery of the material. In addition, especially when such material has appreciable monetary value, wastage must be prevented. On the other hand, the conveyance of dry powder-like material from the storage place to its place of use is most readily and expeditiously accomplished with the material contained in conveyor buckets, which are fed by gravity, and are likewise discharged by gravity at the place of use. In the one location, the conveyor is beneath the storage bin, and in the other, it is above the receiver.

By the present invention dry powder-like material is conveyed from one location to another with agitation, by the means that convey it, warranting its proper conditioning; the conveying means is of a character that obviates wastage, provides storage for testing and controlling delivery, and has a conformation that insures the completeness of delivery of a charge or load. Furthermore, the force of gravity is utilized both for loading and for discharging the conveying means, and the apparatus required is very simple and inexpensive.

These objects of the invention are accomplished by means of a closed container or bucket having a valved opening in one end and trunnions extending from its middle section. The container is made conical at the valved end and cylindrical at the other end; so that in filling, the total volume is utilized, and in discharging, the total contents are removed. Such a formation also gives a low center of gravity with the valved opening upward. A floor transporting means, such as a lift truck, conveys the container underneath and away from the storage bin, and for this purpose, legs or extensions on the container are provided so that the truck can be rolled beneath the container when it is standing on the floor. By means of a removable yoke and a chain block traveling on a monorail the container is lifted, and it is inverted by means of a second chain block, associated with the first. The container contents are agitated by the inversion, and their weight, resting on the closed valve, insures a tight joint to prevent wastage. The container is latched in its inverted position, transported to the place of discharge, and seated on the receiving receptacle. A gasket is interposed between the container and the receiver, forming a dust-tight connection between them, and all wastage of material is thereby prevented during the discharging operation. When discharged the container is returned to the storage place, righted, and conveyed by truck beneath the bin for refilling.

By having the container separable from the truck and the overhead conveyor, the same conveying elements can be used with an indefinite number of containers.

For a more complete understanding of the invention reference is to be had to the accompanying drawing in which Fig. 1 is an elevation of a container in filling position;

Fig. 2 is a bottom view of the container;

Fig. 3 is an elevation of the container in a position to be inverted;

Fig. 4 is an elevation of the container inverted and in discharging position;

Fig. 5 is a section in the plane of the valve; and

Fig. 6 is a cross-section of the valve and its seat.

The container 1 consists of cylindrical body 2 and a conical end portion 3. The body sides 4, 5 project beyond the bottom 6, forming legs between which a lift-truck can be rolled. Trunnions 7, 8 project from each side at the middle section. The conical end portion is preferably given a slope corresponding to or somewhat less than the angle of repose of the material to be transported so that the total volume of the container can be utilized; and it is closed by a gate valve 9, which slides within its enclosing seat 10, and gaskets 11 in the seat form contacts with both sides of the valve. A closure 12 in the bottom of the tank gives access to the interior from that end.

A yoke 13 detachably engages the trunnions and is lifted by means of a chain block 14 mounted on the monorail 15. A second chain block 16, which may, if desired, be connected to the first by a bar 17, carries a chain 18, which has a bar 19 at the end and passed through an opening 20 in the body for engaging the container and inverting it. Projecting ears 21 on the body are engaged by latches 22 carried by the yoke, and hold the container in the inverted position.

For filling, the container is rolled beneath a storage bin 23, and charged with the desired amount of material, which can be to the extent of the container's total volume; the valve is then closed. A truck transports the container to a mono-rail where the yoke is attached and the container lifted. It is then inverted and conveyed in the inverted position to a discharging location. The weight of the material on the valve presses it tightly against its seat and gasket. The inversion agitates the contents and any packed material is consequently loosened. If deemed necessary, the agitation can be repeated.

While any suitable receiver for the material may be used, a preferred form shown in the drawing consists of a spout 24 having a neck 25 about which is placed a soft rubber gasket 26. When the container is lowered upon the spout it compresses the gasket by its own weight. Further compression is also caused by the weight of material supported by the conical end portion, and a dust-tight joint results, preventing any escape of material when the valve is opened and the contents discharged.

It is obvious that if desired, the container need not be conveyed to the discharging point inverted, but can be left in the filling position until the point of discharge is reached and then inverted. It is preferable, however, to invert the container before transporting it to a discharging location, since it enables more accurate spotting of the container over the receiver spout.

I claim:

1. A material conveying system comprising in combination a closed container having a valve controlled opening in one end, overhead transporting means, means for detachably connecting said container to said transporting means, and means in combination with said transporting means for inverting said container.

2. A material conveying system comprising in combination a closed container having a valve-controlled opening in one end and trunnions at the middle section, floor transporting means for contacting the other end of the container and carrying it to and from a filling location, and overhead transporting means including a yoke adapted to be removably attached to the trunnions, for carrying the container to and from a discharging location.

3. A material conveying system comprising in combination a closed container having a valve-controlled opening in one end and trunnions at the middle section, floor transporting means for contacting the other end of the container and carrying it with the valve opening upward to and from a filling location, overhead transporting means including a yoke adapted to be removably attached to the trunnions, and container-inverting means.

4. A material handling system comprising in combination a closed container having a valve controlled opening in one end, means for conveying the container with the opening downward to a receiver, and means providing a dust-tight connection between the container opening and the receiver.

5. A material handling system comprising in combination a closed container having a valve controlled opening in one end, a receiver for the material, means for placing the container with the opening upon said receiver, and a soft rubber gasket adapted to be interposed between said opening and said receiver.

6. A material handling system comprising in combination a closed container having a conical end portion and a valve controlled opening therein, a receiver for the material, means for placing the container with the conical end portion in contact with said receiver, and a soft rubber gasket adapted to be interposed between said portion and said receiver.

7. In a material handling system comprising means for conveying material, a closed container having a valve-controlled opening in one end, side-extensions forming legs at the other end, and trunnions at the middle section.

8. In a material handling system comprising means for conveying material, a closed container having an opening therein, a valve seat formed about said opening, a slide valve mounted in said seat, and gaskets in said seat contacting both sides of said valve.

9. In a material handling system comprising means for conveying material, a portable closed container for powder-like material comprising a cylindrical portion and a conical end portion, said conical portion having a slope in substantial correspondence with the angle of repose of the material, and having a valved opening therein.

10. In a material handling system comprising means for conveying material, a closed container having a valve-controlled opening in one end, legs at the other end, and trunnions at the middle section.

11. A material conveying system comprising in combination a closed container having a valve-controlled opening therein, means for transporting said container, and means for inverting said container.

12. A material conveying system comprising in combination a closed container having a valve controlled opening therein, means for inverting said container and means for transporting said container in inverted position.

13. In a material handling system, a closed container having a valve-controlled opening in one end, legs at the other end of said container, trunnions on opposite sides of the middle section of said container, and means for suspending and transporting said container, said means including a removable yoke adapted to cooperate with said trunnions.

14. A material handling system comprising in combination a closed container having a valve-controlled opening in one end for filling and emptying said container, trunnions on opposite sides of said container, means for suspending and transporting said container, said means including a removable yoke adapted to cooperate with said trunnions, and means for inverting said container.

15. A material handling system comprising in combination a closed container having a valve-controlled opening in one end for filling and emptying said container, trunnions on opposite sides of said container, means for suspending and transporting said container, said means including a removable yoke adapted to cooperate with said trunnions, and means in combination with said transporting means for inverting said container and for transporting it in inverted position.

16. A material handling system comprising in combination a closed container comprising a cylindrical portion and a conical portion, said conical portion having a valve-controlled opening for filling and emptying said container, trunnions on opposite sides of said cylindrical portion, means for suspending and transporting said container, said means including a removable yoke adapted to cooperate with said trunnions, means in combination with said transporting means for inverting said container, and means on said yoke for securing said container in inverted position.

17. A material handling system comprising in combination a closed container comprising a cylindrical portion and a conical portion, said conical portion having an opening for filling and emptying said container, a valve seat formed about said opening, a slide valve mounted in said seat, gaskets in said seat contacting both sides of said valve, trunnions on opposite sides of said cylindrical portion, means for suspending and transporting said container, said means including a removable yoke adapted to cooperate with said trunnions, means in combination with said transporting means for inverting said container, and means on said yoke for securing said container in inverted position.

In testimony whereof I affix my signature.
CLARENCE G. KIPLINGER.